United States Patent
Yeganeh et al.

(10) Patent No.: US 8,500,887 B2
(45) Date of Patent: Aug. 6, 2013

(54) METHOD OF PROTECTING A SOLID ADSORBENT AND A PROTECTED SOLID ADSORBENT

(75) Inventors: Mohsen S. Yeganeh, Hillsborough, NJ (US); Bhupender S. Minhas, Bridgewater, NJ (US); Sufang Zhao, Vienna, VA (US); Tahmid I. Mizan, Bridgewater, NJ (US); Richard W. Flynn, Elizabeth, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 136 days.

(21) Appl. No.: 13/035,502

(22) Filed: Feb. 25, 2011

(65) Prior Publication Data

US 2011/0232493 A1    Sep. 29, 2011

Related U.S. Application Data

(60) Provisional application No. 61/317,417, filed on Mar. 25, 2010.

(51) Int. Cl.
*B01D 53/02* (2006.01)

(52) U.S. Cl.
USPC ............ 96/146; 96/154; 95/114; 95/115; 95/148; 502/60; 502/400; 502/401; 977/755

(58) Field of Classification Search
USPC ......... 96/146, 154; 95/114, 115, 148; 502/60, 502/400, 401; 977/755
See application file for complete search history.

(56) References Cited

U.S. PATENT DOCUMENTS

| | | | | |
|---|---|---|---|---|
| 6,077,488 A | * | 6/2000 | Jain et al. | 423/210 |
| 6,797,043 B2 | * | 9/2004 | Nalette et al. | 96/134 |
| 6,890,373 B2 | * | 5/2005 | Nemoto et al. | 95/90 |
| 2001/0055554 A1 | * | 12/2001 | Hoke et al. | 423/210 |
| 2007/0051238 A1 | * | 3/2007 | Jain et al. | 95/96 |
| 2007/0092735 A1 | | 4/2007 | Bruner et al. | |
| 2009/0038477 A1 | * | 2/2009 | Abe et al. | 96/154 |
| 2010/0024643 A1 | * | 2/2010 | Bradley | 95/139 |

FOREIGN PATENT DOCUMENTS

| | | |
|---|---|---|
| GB | 1420796 | 1/1976 |
| WO | 2005073644 A1 | 8/2005 |
| WO | 2007111738 A2 | 10/2007 |
| WO | WO 2008009911 A2 * | 1/2008 |

OTHER PUBLICATIONS

PCT/US2011/029758, PCT International Search Report, Form PCT/ISA/210, dated Aug. 4, 2011, 6 pgs.
PCT/US2011/029758, PCT Written Opinion of the International Searching Authority, Form PCT/ISA/237, dated Aug. 4, 2011, 7 pgs.

(Continued)

*Primary Examiner* — Christopher P Jones
(74) *Attorney, Agent, or Firm* — Glenn T. Barrett; Malcolm D. Keen (57) ABSTRACT

The present application provides a protected solid adsorbent that includes a solid adsorbent substrate and a surface layer at least partially coating the solid adsorbent substrate, the surface layer being generally permeable to an active agent. Additionally, a process for protecting a solid adsorbent and an adsorption system that includes a vessel containing the protected solid adsorbent is provided.

13 Claims, 7 Drawing Sheets

OTHER PUBLICATIONS

McCarley, Ken C., et al. "Development of a Model Surface Flow Membrane by Modification of Porous γ-alumina with Octadecyltrichlorosilane", Separation and Purification Technology, Elsevier Science, Oct. 1, 2001, vol. 25, pp. 195-210.

Ikeda, Shigeru, et al. "Direct Observation of Bimodal Amphiphilic Surface Strucures of Zeolite Particles for a Novel Liquid-Liquid Phase Boundary Catalysis", Langmuir, Dec. 1, 2001, vol. 17., pp. 7976-7979.

Ogawa, Haruo, et al. "Octadecyl Immobilized H-ZSM-5-Catalyzed Ring-Openings of Epoxides with Water in Liquid Phase Accompanying Shape-Selective Property", Catalysis Letters, Jan. 1, 1992, pp. 39-42.

Li, Gang, et al. "Competition of CO2/H2O in Adsorption Based CO2 Capture", Science Direct, Energy Procedia, vol. 1, Feb. 1, 2009, pp. 1123-1130.

Li, Gang, et al. "Surface Modification of 13X Zeolite Beads for CO2 Capture from Humid Flue-Gas Streams", BPacific Basin Conference on Adsorption Science and Technology (PBAST), May 27, 2009, pp. 1-2.

* cited by examiner

METHOD OF PROTECTING A SOLID ADSORBENT AND A PROTECTED SOLID ADSORBENT

CROSS REFERENCE TO RELATED APPLICATIONS

This application relates and claims priority to U.S. Provisional Patent Application No. 61/317,471, filed on Mar. 25, 2010.

FIELD OF THE INVENTION

The present application relates to a protected solid adsorbent, a method of protecting solid adsorbents against reactive fluids, and an adsorption system that includes a protected solid adsorbent.

BACKGROUND OF THE INVENTION

Solid adsorbents such as zeolites can be used in heat-to-power (HTP) and heat-to-chilling (HTC) sorption processes. In a HTP or HTC process, active agents in the form of gas molecules, such as $CO_2$, adsorb onto the solid adsorbent at temperatures close to ambient at an initial pressure in a closed vessel. By introducing heat to the system, desorption of gas molecules occurs, which increases the number of gas molecules in the vessel producing a high pressure gas. The high pressure gas can be converted to power using a turbine and/or chilling through an expansion valve. To maintain continuous operation, the adsorbent must be then cooled down to a temperature close to the initial value. To make the HTC and HTP economically viable, the heating and cooling processes must be carried out in a very short period of time.

Heating and cooling the adsorbent from outside the vessel, using for example shell and tube geometry, requires a long period of time due to the low effective thermal conductivity between the heating/cooling fluid and the adsorbent and the large heat capacity of the shell and tube vessel and its contents.

Accordingly, there remains a need to make HTC and HTP processes utilizing direct heating and cooling of the adsorbent that reduce the cycle time needed to achieve temperature swings ($\Delta T$) that are required to drive sorption systems (e.g., adsorption systems), reduce the overall size of the system, and more efficiently makes use of available heat sources available to the sorption system. There is also a desire to provide adsorbents that are non-reactive, or substantially non-reactive, toward the heating or cooling fluid so that adsorption of the gas onto the adsorbent is not unduly inhibited and the adsorbent is not degraded or destroyed by direct contact with the heating or cooling fluid.

US Patent Publication No. 2007/0092735 to Bruner et al., entitled "Polymeric Organometallic Films" discloses a method of applying a thick and durable self-assembled films or layers onto substrates for application in titanium orthopedic implants, organic light emitting diodes, ceramics, semiconductors and polymers. The films disclosed by Bruner are not suitable for use on porous adsorbent materials.

There is a need for a suitable selective nano layer coating for use on porous adsorbent materials (e.g., zeolite pellets) for protecting the adsorbent materials from fluids (e.g. water) while permitting an active gas (e.g., $CO_2$) to penetrate the nano layer coatings and adsorb onto the adsorbent.

"Surface Modification of 13X Zeolite Beads for $CO_2$ Capture From Humid Flue-Gas Streams" by Gang Li et al., discloses a method to produce a modified zeolite 13X having a better tolerance against water vapor, which normally exists in flue-gas streams compared to unmodified 13 X pellets against water vapor. The Si:Al ratio in the pellets is increased in order to obtain partial hydrophobicity. Gang Li et al rely upon the use of a coating that contains Si. Gang Li et al disclose a method consisting of coating zeolite 13 X with organosilane and then burning the coated pellet at a temperature greater or equal to 300 C for 10 to 15 hours. The high temperature treatment burns off the organic part of the coating and leaves additional Si on the pellets, thereby increasing the Si:Al ratio. The methodology makes the pellet partially hydrophobic and reduces the water vapor adsorption by 33%. As illustrated in Examples 14 and 15 described below, the approach outlined by Gang Li et al is not effective in producing a solid adsorbent that is capable of adsorbing CO2 while having no interaction with the liquid heating/cooling fluid.

There is a need for a hydrophobic nano layer protected solid adsorbent capable of adsorbing CO2 gas while having no interaction with a liquid phase cooling/heating fluid (e.g., water or triethylene glycol (TEG)) whereby the highly hydrophobic protected layer keeps water or TEG away from the surface reducing the interaction between the pellets and the liquid to zero.

SUMMARY OF THE INVENTION

By protecting a solid adsorbent with a selective surface layer that at least partially coats the solid adsorbent, a HTC or HTP process utilizing direct heating and cooling of the solid adsorbent that reduces and/or eliminates the reactions between a heating/cooling fluid and the adsorbent is provided. The selectivity of the protective layer eliminates the interaction between heating/cooling fluid while ensures the access of the active gas to the adsorbent for adsorption and desorption necessary in HTC and HTP processes.

Accordingly, one embodiment of the present application provides a selective protected solid adsorbent that includes a solid adsorbent substrate and a surface layer at least partially coating the solid adsorbent substrate, the surface layer being generally permeable to an active agent. In an embodiment, the surface layer is a nano layer. Additionally and/or alternatively, if the heating or cooling fluid for the system is aqueous, the surface layer preferably is hydrophobic.

In a still further embodiment, the surface layer can include an organometallic compound (e.g., octadecyltrichlorosilane or OTS).

The present application also provides a process for protecting a solid adsorbent that includes selecting a solid adsorbent substrate and applying a selective surface layer to the solid adsorbent substrate to at least partially coat the solid adsorbent, the surface layer being generally permeable to an active agent. In one embodiment, the solid adsorbent is protected from reaction with a heating or cooling fluid.

The present application also provides an adsorption system that includes a vessel containing any one of the protected solid adsorbents described herein, a supply of working fluid in fluid communication with the vessel, the working fluid including the active agent, and a supply of heating or cooling fluid in fluid communication with the vessel. In one embodiment, the heating or cooling fluid and the working fluid are added together in the vessel.

BRIEF DESCRIPTION OF THE DRAWINGS

The invention will now be described in conjunction with the accompanying drawings in which.

DETAILED DESCRIPTION OF THE INVENTION

The present application will now be described in greater detail in connection with the figures and the following terms. As used herein, the term "solid adsorbent" refers to a material that reversibly binds to a fluid.

As used herein, the term "working fluid" refers to a liquid or gas including an active agent that can reversibly bind to the solid adsorbent.

As used herein, the term "organometallic compound" refers to a compound which contains at least one bond between a carbon atom and a metal or metalloid. In organometallic compounds used as coating materials, the metallo component of the organometallic compounds is from Groups 4-15 based on the IUPAC format for the Periodic Table having Groups 1-18, preferably Group 14, more preferably silicon and tin, especially silicon. The organo components of the organometallic compounds are hydrocarbyl groups having from 1 to 30 carbon atoms, preferably from 1 to 20 carbon atoms, more preferably 1-10 carbon atoms. The hydrocarbyl group may be aliphatic or aromatic groups which aliphatic or aromatic groups may be substituted with functional groups such as oxygen, halogen, hydroxy and the like. Preferred hydrocarbyl groups include methyl, ethyl, methoxy, ethoxy and phenyl. Preferred organometallic compounds include alkoxysilanes, silanes, silazanes and phenyl siloxanes. Especially preferred compounds include alkoxysilanes having from 1 to 4 alkoxy groups, especially tetraalkoxy compounds such as tetraethoxy-silane, dialkoxysilanes having from 1 to 6 alkoxy groups, especially hexamethyl-disiloxane. The organometallic coating on the adsorbent pellets surface should have a high water contact angle, higher than 90 degrees, preferably higher than 110 degrees. The amount of covering of the organometallic coating layer ranges from greater than 25% of the pellets surface to 100% of the pellet surface, preferably from 50 to 100%, more preferably from 80 to 100%. The amount of pellet surface covered is most preferably 100% or as close to 100% as possible.

Heating and cooling an adsorbent from outside a vessel, using for example shell and tube geometry, requires a long period of time due to the low effective thermal conductivity between the heating/cooling fluid and the adsorbent and the large heat capacity of the shell and tube vessel and its contents. In order to overcome this limitation, direct heating and cooling of the adsorbent has been proposed, as described in an application entitled "Sorption Systems Having Improve Cycle Times", filed on Mar. 9, 2010, as U.S. Provisional Patent Application No. 61/312,066 herewith, the contents of which are incorporated herein in their entirety. For example, a heating/cooling fluid, such as water or triethylene glycol (TEG), is in direct contact with the adsorbent inside the vessel. In such systems it is desirable to utilized adsorbents that are non-reactive, or substantially non-reactive, toward the heating or cooling fluid so that adsorption of the active agent onto the adsorbent is not unduly inhibited.

Thus and in accordance with one aspect of the present application, a protected solid adsorbent is provided. The protected solid adsorbent includes a solid adsorbent substrate and a surface layer at least partially coating the solid adsorbent substrate, the surface layer being generally permeable to an active agent.

Figure 1:
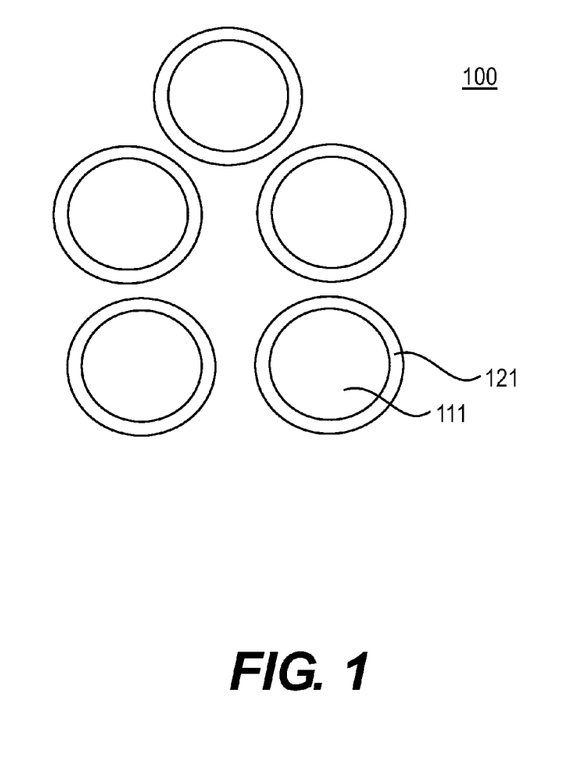
FIG. 1 is a protected solid adsorbent in accordance with an embodiment of the present application.

For the purpose of illustration and not limitation, a protected solid adsorbent 100 in accordance with one aspect of the present application is illustrated in FIG. 1. The protected solid adsorbent 100 includes a solid adsorbent substrate 111 and a surface layer 121 at least partially coating the solid adsorbent substrate.

In one embodiment of the present application, the solid adsorbent substrate is selected from the group consisting of zeolites, metal organic frameworks (MOFs), zeolitic imidazolate frameworks (ZIFs), silicagel, adsorbing polymers, carbon, and activated carbon, and combinations thereof. In a preferred embodiment, the solid adsorbent substrate is a zeolite, such as zeolite 13X. The solid adsorbent substrate can be provided in a variety of shapes and sizes, as appropriate for the desired use and environment. For example and as embodied herein, the solid adsorbent substrate can be provided in the form of one or more pellets. The pellets can be spherical, semi-spherical, substantially spherical, or substantially semi-spherical or any other suitable shape. In one particular embodiment, the pellets are spherical or substantially spherical having an average diameter of 2 mm, although any other suitable shape and sizes can be used (i.e., there is no size limit). A plurality of pellets can be provided to form an adsorption bed in a vessel or the like as is known in the art.

MOF-based sorbents suitable for the present application include, but are not limited to, MOF-based sorbents, including MOF-based sorbents with a plurality of metal, metal oxide, metal cluster or metal oxide cluster building units. As disclosed in International Published Application No. WO 2007/111738, which is hereby incorporated by reference, the metal can be selected from the transition metals in the periodic table, and beryllium. Exemplary metals include zinc (Zn), cadmium (Cd), mercury (Hg), beryllium (Be) and copper (Cu). The metal building units can be linked by organic compounds to form a porous structure, where the organic compounds for linking the adjacent metal building units can include 1,3,5-benzenetribenzoate (BTB); 1,4-benzenedicarboxylate (BDC); cyclobutyl 1,4-benzenedicarboxylate (CB BDC); 2-amino 1,4 benzenedicarboxylate (H2N BDC); tetrahydropyrene 2,7-dicarboxylate (HPDC); terphenyl dicarboxylate (TPDC); 2,6 naphthalene dicarboxylate (2,6-NDC); pyrene 2,7-dicarboxylate (PDC); biphenyl dicarboxylate (BDC); or any dicarboxylate having phenyl compounds.

Specific materials MOF-based sorbent materials include: MOF-177, a material having a general formula of $Zn_4O(1,3,5$-benzenetribenzoate$)_2$; MOF-5, also known as IRMOF-I, a material having a general formula of $Zn_4O(1,4$-benzenedicarboxylate$)_3$; IRMOF-6, a material having a general formula of $Zn_4O($cyclobutyl 1,4-benzenedicarboxylate$)$; IRMOF-3, a material having a general formula of $Zn_4O(2$-amino 1,4 benzenedicarboxylate$)_3$; and IRMOF-11, a material having a general formula of $Zn_4O($terphenyl dicarboxylate$)_3$, or $Zn_4O($tetrahydropyrene 2,7-dicarboxylate$)_3$; IRMOF-8, a material having a general formula of $Zn_4O(2,6$ naphthalene dicarboxylate)$_3$; and Cu-BTC MOF, a material having a general formula of $C_{18}H_6Cu_3O_{12}$ (copper benzene-1,3,5-tricarboxylate).

Exemplary zeolitic imidazole framework (ZIF) sorbent materials include, but are not limited to, ZIF-68, ZIF-60, ZIF-70, ZIF-95, ZIF-100 developed at the University of California at Los Angeles and generally discussed in Nature 453, 207-211 (8 May 2008), hereby incorporated by reference in its entirety.

Zeolite adsorbent materials include, but are not limited to, aluminosilicates that are represented by the formula $M_{2/n}O\cdot Al_2O_3\cdot ySiO_2\cdot wH_2O$, where y is 2 or greater, M is the charge balancing cation, such as sodium, potassium, magnesium and calcium, N is the cation valence, and w represents the moles of water contained in the zeolitic voids. Examples of zeolites that can be included in the methods and systems of the present application include natural and synthetic zeolites.

Natural zeolites include, but are not limited to, chabazite (CAS Registry No. 12251-32-0; typical formula $Ca_2[(AlO_2)_4(SiO_2)_8]\cdot 13H_2O$), mordenite (CAS Registry No. 12173-98-7; typical formula $Na_8[(AlO_2)_8(SiO_2)_{40}]\cdot 24H_2O$), erionite (CAS Registry No. 12150-42-8; typical formula $(Ca, Mg, Na_2, K_2)_{4.5}[(AlO_2)_9(SiO_2)_{27}]\cdot 27H_2O$), faujasite (CAS Registry No. 12173-28-3, typical formula $(Ca, Mg, Na_2, K_2)_{29.5}[(AlO_2)_{59}(SiO_2)_{133}]\cdot 235H_2O$), clinoptilolite (CAS Registry No. 12321-85-6, typical formula $Na_6[(AlO_2)_6(SiO_2)_{30}]\cdot 24H_2O$) and phillipsite (typical formula: $(0.5Ca, Na, K)_3[(AlO_2)_3(SiO_2)_5]\cdot 6H_2O$).

Synthetic zeolites include, but are not limited to, zeolite A (typical formula: $Na_{12}[(AlO_2)_{12}(SiO_2)_{12}]\cdot 27H_2O$), zeolite X (CAS Registry No. 68989-23-1; typical formula: $Na_{86}[AlO_2)_{86}(SiO_2)_{106}]\cdot 264H_2O$), zeolite Y (typical formula: $Na_{56}[(AlO_2)_{56}(SiO_2)_{136}]\cdot 250H_2O$), zeolite L (typical formula: $K_9[(AlO_2)_9(SiO_2)_{27}]\cdot 22H_2O$), zeolite omega (typical formula: $Na_{6.8}TMA_{1.6}[AlO_2)_8(SiO_2)_{28}]\cdot 21H_2O$, where TMA is tetramethylammonium) and ZSM-5 (typical formula: $(Na, TPA)_3[(AlO_2)_3(SiO_2)_{93}]\cdot 16H_2O$, where TPA is tetrapropylammonium).

Zeolites that can be used in the embodiments of the present application also include the zeolites disclosed in the Encyclopedia of Chemical Technology by Kirk-Othmer, Volume 16, Fourth Edition, under the heading "Molecular Sieves," which is hereby incorporated by reference in its entirety.

Synthetic zeolite sorbent materials are commercially available, such as under the Sylosiv® brand from W.R. Grace and Co. (Columbia, Md.) and from Chengdu Beyond Chemical (Sichuan, P.R. China). For example, Sylosiv® A10 is one commercially available zeolite 13 X product.

In one embodiment of the present application, the surface layer can be a nano layer, wherein the surface layer has a thickness of less than 60 nm, although a thickness of less than 15 nm is preferred. In a preferred embodiment, the surface layer allows a cooling or heating fluid to come close to the surface of the solid adsorbent for rapid heat transfer but at the same time prevents the interaction or reaction between the heating or cooling fluid and the solid adsorbent. In a preferred embodiment, the permeability of the surface layer can be provided by a porous structure that allows the active agent of the working fluid to penetrate through the surface layer and interact with the solid adsorbent. The surface layer may comprise hydro- or fluoro-carbon organosilicon compounds with a carbon number between 5 and 50, but preferably between 10 and 25.

Figure 2:
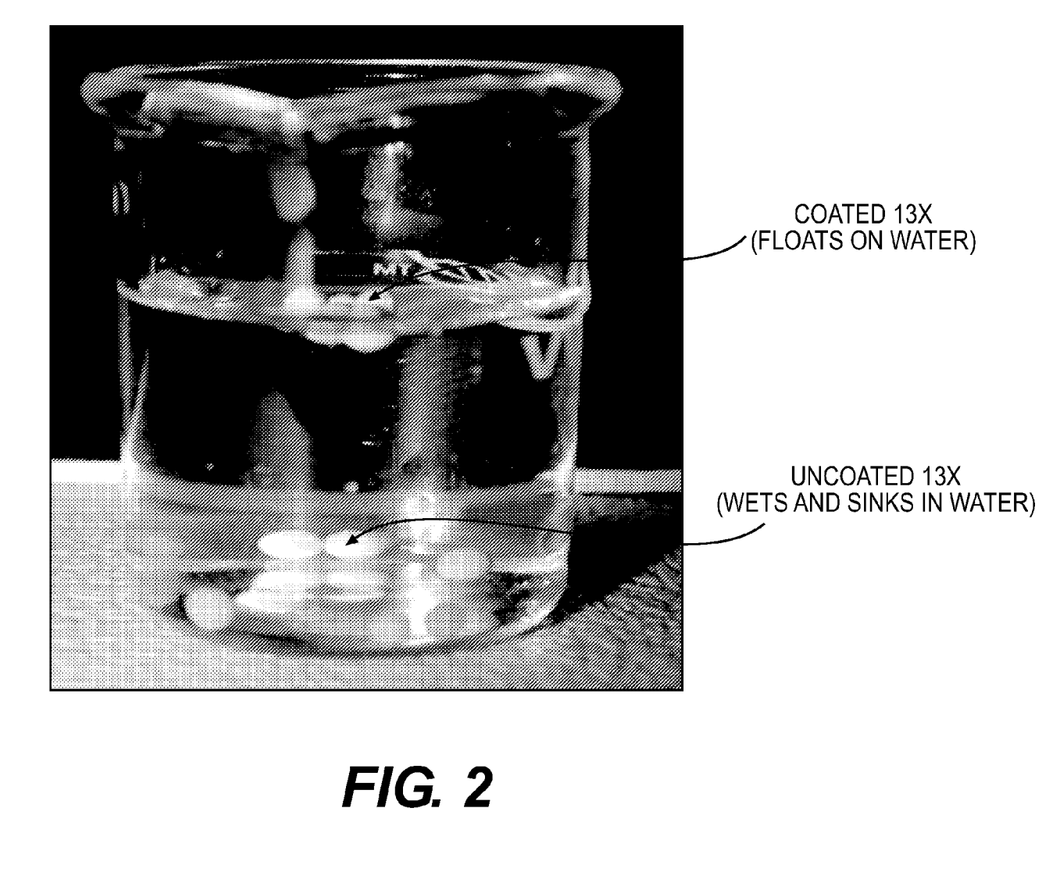
FIG. 2 is an illustration of a coated solid adsorbent in accordance with an aspect of the present invention compared to an uncoated adsorbent.

Additionally or alternatively, permeability can be achieved by the material of the surface layer. In a preferred embodiment, when the heating or cooling fluid is aqueous, the surface layer is hydrophobic to reduce or inhibit interaction of the heating or cooling fluid with the substrate. The degree of hydrophobicity should be quantified by measuring the temperature rise of a coated and uncoated solid adsorbent when in contact with liquid water. When three (3) grams of water are brought in contact with one (1) gram of a solid adsorbent, the temperature rise of the coated solid adsorbent should be less than one-forth, and preferably less than one-hundredth, of the temperature rise when an activated uncoated solid is used. The degree of hydrophobicity can also be quantified by a contact angle measurement, if the size and porosity of the solid adsorbent allows. The contact angle between water and the coating should be greater than 90 degrees, and preferably greater than about 110 degrees. The degree of hydrophobicity may be qualitatively checked if the uncoated solid adsorbent sinks in water, as shown in FIG. 2. The hydrophobic coated surface should float on the water surface, as shown in FIG. 2.

In one particular embodiment, the surface layer includes octadecylthrichlorosilane (OTS) which is applied from a solution of OTS at a concentration of 0.0024 by volume in a carrier solution consists of tetrachloride ($CCl_4$) at a concentration of 0.122 by volume, hexadecane at a concentration of 0.854 by volume, and water saturated $CHCl_3:CCl_4$ (e.g., a water saturated $CHCl_3:CCl_4$ in a 2:3 volume:volume ratio) at a concentration of 0.024 by volume.

The surface layer can be applied by a variety of known techniques. Exemplary techniques include but are not limited to dipping, spraying, and vapor deposition. Other techniques capable of providing the surface layer are considered to be well within the scope of the present invention. If necessary or desired, the solid adsorbent substrate can be treated prior to coating to enhance adhesion or permeability of the surface layer. Additionally, known additives or surfactants can be used to increase application and effectiveness of the surface layer.

In one embodiment, the active agent is one or more of carbon dioxide, methane, ethane, propane, butane, and chlorofluorocarbons. Preferably, the active agent is carbon dioxide. In one embodiment, the active agent is a working fluid. Alternatively, the working fluid can include the active agent.

In accordance with another aspect of the present application, a process for protecting a solid adsorbent is provided. The process includes selecting a solid adsorbent substrate and applying a surface layer to the solid adsorbent substrate to at least partially coat the solid adsorbent, the surface layer being generally permeable to an active agent. The process can have any of the features of the solid adsorbent or surface layer described above for the protected solid adsorbent. Preferably, the solid adsorbent is protected from reaction with a heating or cooling fluid.

In accordance with another aspect of the present application, an adsorption system is provided. The adsorption system includes a vessel containing a protected solid adsorbent as described above, a supply of working fluid in fluid communication with the vessel, the working fluid including the active agent, and a supply of heating or cooling fluid in fluid communication with the vessel. Components and operation of the adsorption system are described in more detail in U.S. patent application Ser. No. 12/603,243 entitled, "System Using Unutilized Heat for Cooling and/or Power Generation," which is incorporated by reference in its entirety herein. The protected solid adsorbent of the adsorption system can have any of the features of the solid adsorbent or surface layer described above for the protected solid adsorbent. Preferably, the surface layer is arranged to protect the solid adsorbent from reaction with the heating or cooling fluid. Permeability of the surface layer can include sufficient porosity to allow the active agent, e.g. carbon dioxide, to penetrate through the surface layer and adsorb onto the solid adsorbent.

The vessel can be an adsorption vessel, such as an adsorption bed or any other suitable vessel. In one embodiment of the present invention, a structured adsorbent packing (e.g., an adsorbent monolith) is used as an adsorbent bed. Various solid adsorbents can be used in this embodiment, such as zeolite 13X, which serve as the solid adsorbent substrate. The monolith 13X substrate is at least partially coated with a surface layer as described above that does not allow heating/cooling media (e.g., water or TEG) to wet the monolith surface. This design can be incorporated by person of ordinary skill in various adsorption processes.

In one embodiment, a feed containing both the heating or cooling fluid (e.g. triethylene glycol (TEG)) and the working fluid are added together in the vessel, e.g. the adsorbent monolith. Internally, the monolith adsorption bed contains a multitude of channels, in which the adsorbent is contained along the entire length (or substantially the entire length) of the channel. Further, the adsorption system can also include a source of waste heat that is introduced to the heating fluid. Because the working fluid is directly heated by the heating media, the temperature swing cycle time can be much shorter as compared to what is feasible in designs that rely on indirect heating and cooling (e.g., less than 5 minutes, or less than 3 minutes, or less than 1 minute, or less than 30 seconds, or less than 20 seconds depending on the geometry and size of the system). Thus, this design is particularly suitable for adsorption systems that employ low grade heat sources, such as unutilized or waste heat.

In one embodiment, the desorbed fluid can be directed to a driver device in fluid communication with the vessel to provide electricity or work. The driver device can be a turbine, a turboexpander or any other suitable device to generate power or work. Alternatively or additionally, the desorbed fluid can be directed to an expansion valve or a vessel to provide chilling. The vessel can be a chiller device, an evaporator apparatus, turbo alternator or any other suitable instrument. In a preferred embodiment, the desorbed fluid is directed to a driver device and a vessel to provide both power and chilling.

EXAMPLE 1

For purposes of illustration and not limitation, an example of a protected solid adsorbent is provided in one representative embodiment of the present application, as depicted in FIG. 1. In this example, 100 grams of 2 mm spherical zeolite 13X pellets (111 in FIG. 1), obtained from Grace Davison, were heated in air at 350° C. for 15 hours. The pellets were then cooled down to near ambient temperature under $N_2$ gas. A coating solution (121 in FIG. 1) consisting of 140 cc of hexadecane (purchased from Sigma-Aldrich), 20 cc of carbon tetrachloride (purchased from Aldrich), 4 cc of water saturated $CHCl_3$:$CCl_4$ in a 2:3 volume: volume ratio ($CHCl_3$ was purchased from Aldrich), and 400 micro liter of octadecyltrichlorosilane (OTS) (purchased from United Chemical Technologies, Inc) was prepared. The heat treated zeolite 13X pellets were put into the solution for 30 minutes. The pellets were then rinsed with heptane and left in a vacuum oven at 140° C. for 15 hours. Processing can require re-rinsing with heptane and re-heating, as necessary. The above mentioned procedures provide a protective nano layer coating for the zeolite pellets. These materials, and materials that were treated in a similar manner, will be referred to as a nano layer coated 13X zeolite thereafter In one example, a portion of the nano layer coated zeolite 13X was placed on the surface of water in a small beaker. The pellets floated, which indicates a surface hydrophobicity and confirms the existence of the coating. A portion of the uncoated zeolite 13X pellets was placed on the surface of water in a small beaker. The uncoated pellets sank to the bottom of the beaker, as seen in FIG. 2.

EXAMPLE 2

Figure 3A:
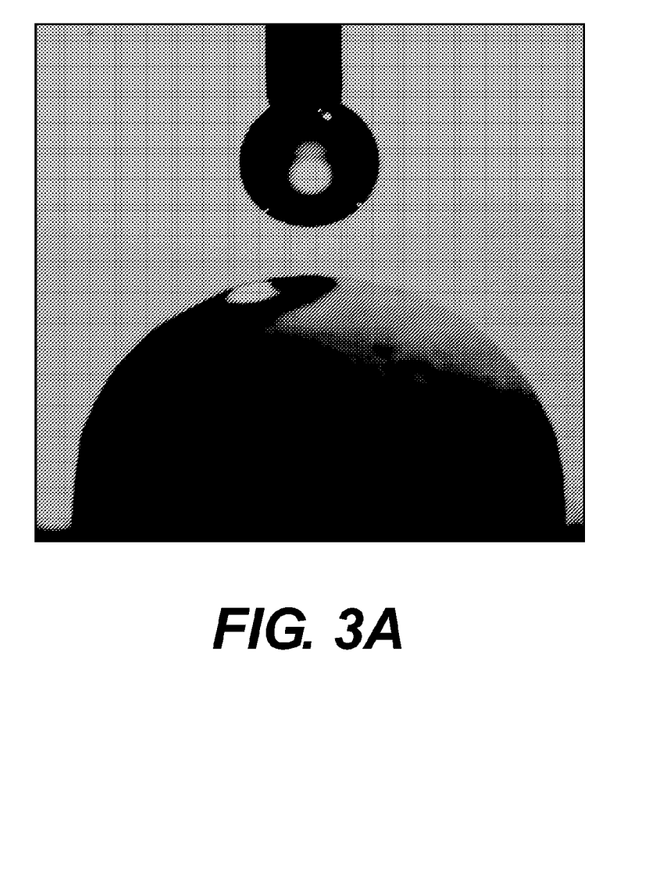
FIG. 3 is an illustration of a nano layer coated solid adsorbent pellet before (a) and after (b) contacting a water droplet.
Figure 3B:
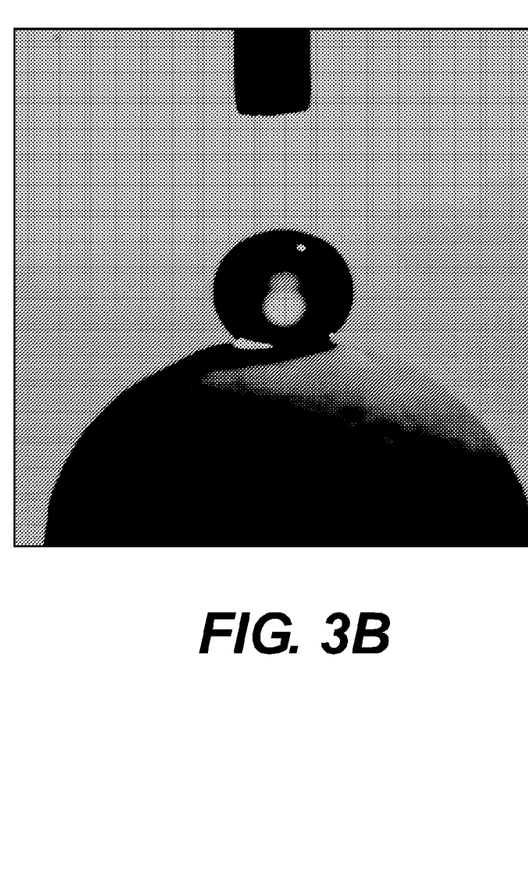

In another example of a protected solid adsorbent in one representative embodiment of the present application, the contact angle of a water droplet on a nano layer coated 13X pellet was measured. The water contact angle was measured using a VCA2500XE Video Contact Angle Analyzer from AST Products, Inc. (Billerica, Mass.). Water contact angle as used herein thus refers to that measured using a VCA2500XE. The contact angle is about 130 degrees, indicating a highly hydrophobic surface, as seen in FIG. 3.

EXAMPLE 3

In another example of a protected solid adsorbent in one representative embodiment of the present application, one (1) gram of the nano layer coated zeolite 13X was placed in a small beaker in direct contact with a thermocouple. Three (3) grams of water was poured onto the pellets at temperature of 25.9 C. There was no temperature change observed after pouring water on the nano layer coated zeolite 13X, indicating that liquid water does not interact with nano layer coated zeolite 13X.

EXAMPLE 4

In another example of a protected solid adsorbent in one representative embodiment of the present application, one (1) gram of the nano layer coated zeolite 13X was placed in a small beaker in direct contact with a thermocouple. Three (3) grams of TEG was poured onto the pellets at temperature of 23.3 C. There was no temperature change observed after pouring TEG on the nano layer coated zeolite 13X, indicating that liquid TEG does not interact with these materials.

EXAMPLE 5

In another example, 15.6 grams of as received zeolite 13X was left in an air oven at 350C for twenty (20) hours to activate. Activation can also be carried out under vacuum for 1 to 10 hours at 350 C. The purpose of activation is to free up all adsorption sites of the adsorbent from water moisture that adsorbed onto the adsorbent during shipping, loading and storage. This is critical step in using 13X zeolite pellets. In this example, the activated materials were cooled down under vacuum to room temperature. These materials, and materials that are treated in a similar manner, will be referred to as activated 13X zeolite thereafter. One (1) gram of the activated 13x zeolite was placed in a small beaker in direct contact with a thermocouple. Three (3) grams of water was poured onto the pellets at temperature of 26.7 C. A sudden increase in temperature to maximum value of 65.8 C was observed. The increase of about 39 C indicates a strong interaction between the activated uncoated zeolites and water. The present example illustrates the effectiveness of the nano layer v. activated. The uncoated pellets react with water. As a result of this reaction, the adsorbent material is likely to become degraded and less effective at adsorbing the active agent (e.g., $CO_2$).

EXAMPLE 6

In one example, 1 gram of the activated 13X zeolite was placed in a small beaker in direct contact with a thermocouple. 3 grams of TEG was poured onto the pellets at temperature of 26.7° C. A sudden increase in temperature to maximum value of 55.1° C. was observed. The increase of about 28° C. indicates a strong interaction between the activated uncoated zeolites and TEG. The strong interaction between TEG and the activated 13X pellets prevents the working fluid (i.e. $CO_2$) from adequately adsorbing onto the zeolite which is detrimental to the HTP and HTC operations. In addition, the repeated interactions between the adsorbent and the heating/cooling fluid causes degradation of the adsorbent materials.

EXAMPLE 7

Figure 4A:
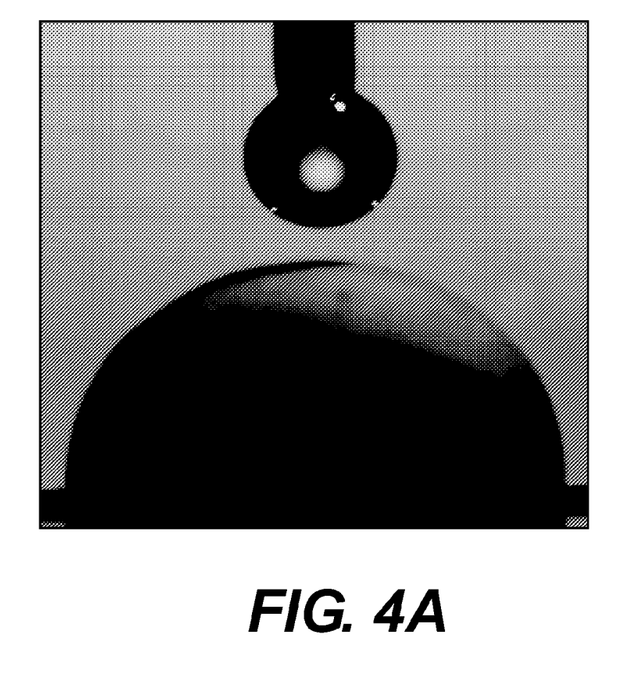
FIG. 4 is an illustration of an activated solid adsorbent pellet before (a) and after (b) contacting a water droplet.
Figure 4B:
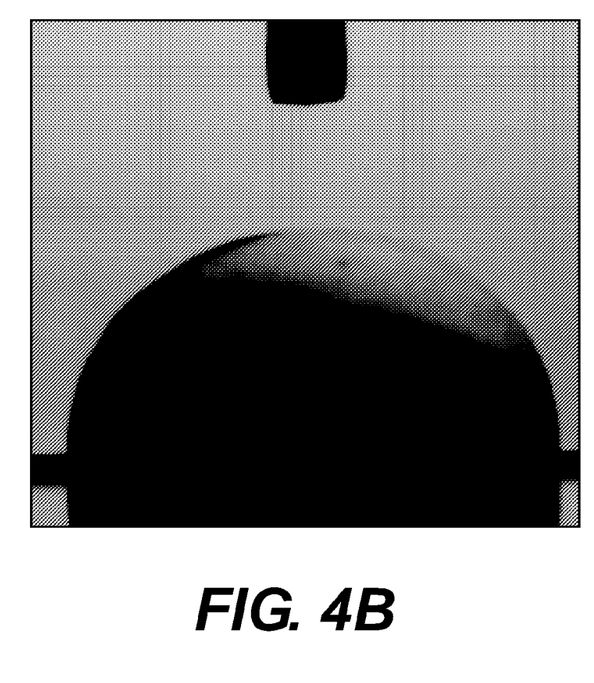

In one example, contact angle of a water droplet on an activated zeolite 13X pellet was measured. Water droplet completely wetted the surface of the pellet with a contact angle close to zero indicating a highly hydrophilic surface which is strongly interactive water, as shown in FIG. 4. FIG. 4A shows the water droplet before contacting the pellet. After water droplet contacts the activated zeolite 13 X pellet it is completely wetted and adsorbed onto the pellet and cannot be visible on the surface. See FIG. 4B. The strong interaction between water and activated 13X pellets prevents working fluid (i.e. $CO_2$) from adequately adsorbing onto the zeolite which is detrimental to the HTP and HTC operations. In addition, the repeated interactions between the adsorbent and the heating/cooling fluid would cause degradation of the adsorbent materials.

EXAMPLE 8

Figure 5:
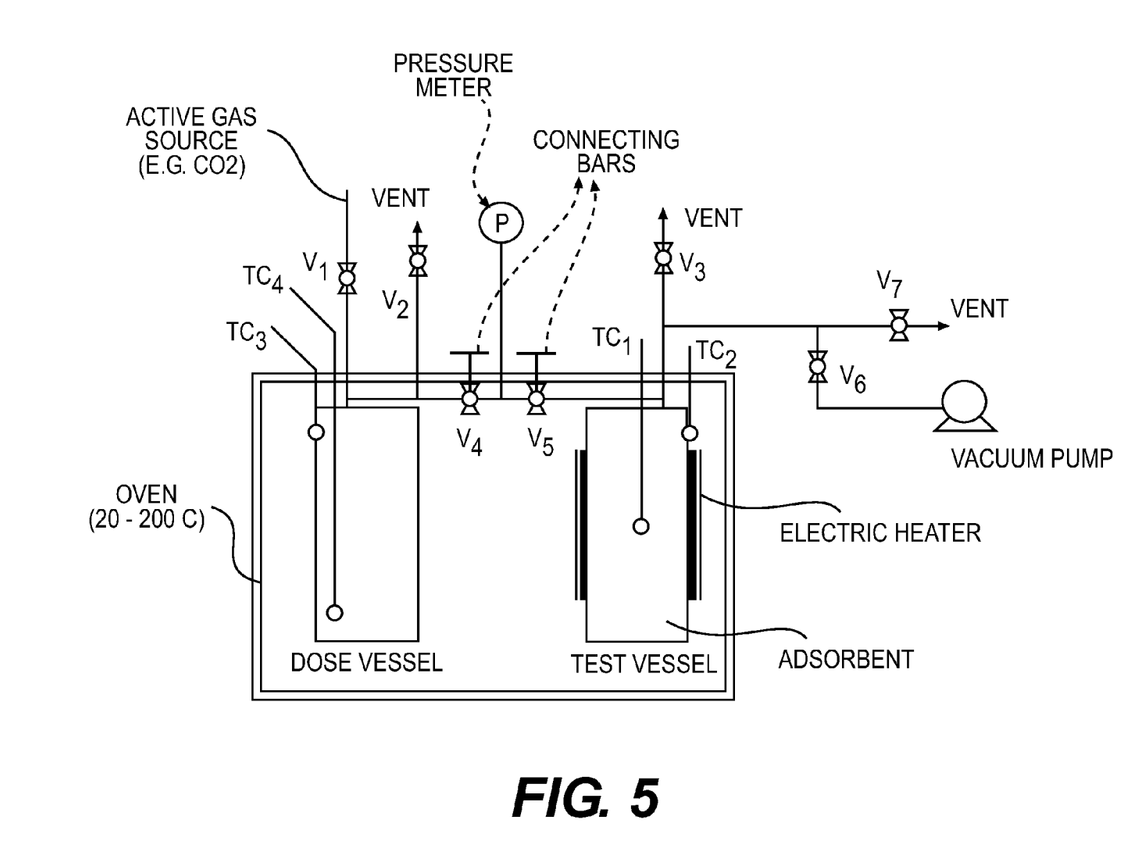
FIG. 5 is a schematic diagram illustrating a testing apparatus for use in conducting the experiments set forth in Examples 8-13.

The adsorption/desorption apparatus, displayed in FIG. 5, consists of two 300 CC high pressure stainless steel vessels, labeled "Dose Vessel" and "Test Vessel" that are mounted in an oven that can provide heat with temperatures up to 200° C. During the operation of the oven, the temperature variation between the inside and outside of both vessels is less than 2° C. at all times. The dose vessel is directly connected to a source of active gas through valve V1. Through valves V4 and V5, the dose vessel is connected to the test vessel where solid adsorbents are kept. Valves V4 and V5 can be accessed from outside the oven using connecting bars. The pressure meter measures the pressure of various parts of the apparatus depending on the condition of the valves. The apparatus is capable of putting the vessel under vacuum using a vacuum pump. Four thermocouples are mounted inside and outside the vessels for monitoring temperatures. An electric band heater wrapped around the test vessel is able to heat the vessel to 350° C. for activation of uncoated adsorbents.

Using the above mentioned apparatus, with both vessels empty of solid adsorbents and with all valves closed except valves V6, V5 and V4, both vessels were brought under vacuum. Valve V6 was then closed and $CO_2$ was sent to the vessels through valve V1 at 36° C. to obtain a pressure of 504 psia. Valve V1 and V4 were then closed and the pressure of the test vessel as a function of temperature was recorded. The temperature variation between the inside and outside of both vessels was maintained at less than 2° C. at all times.

Figure 6:
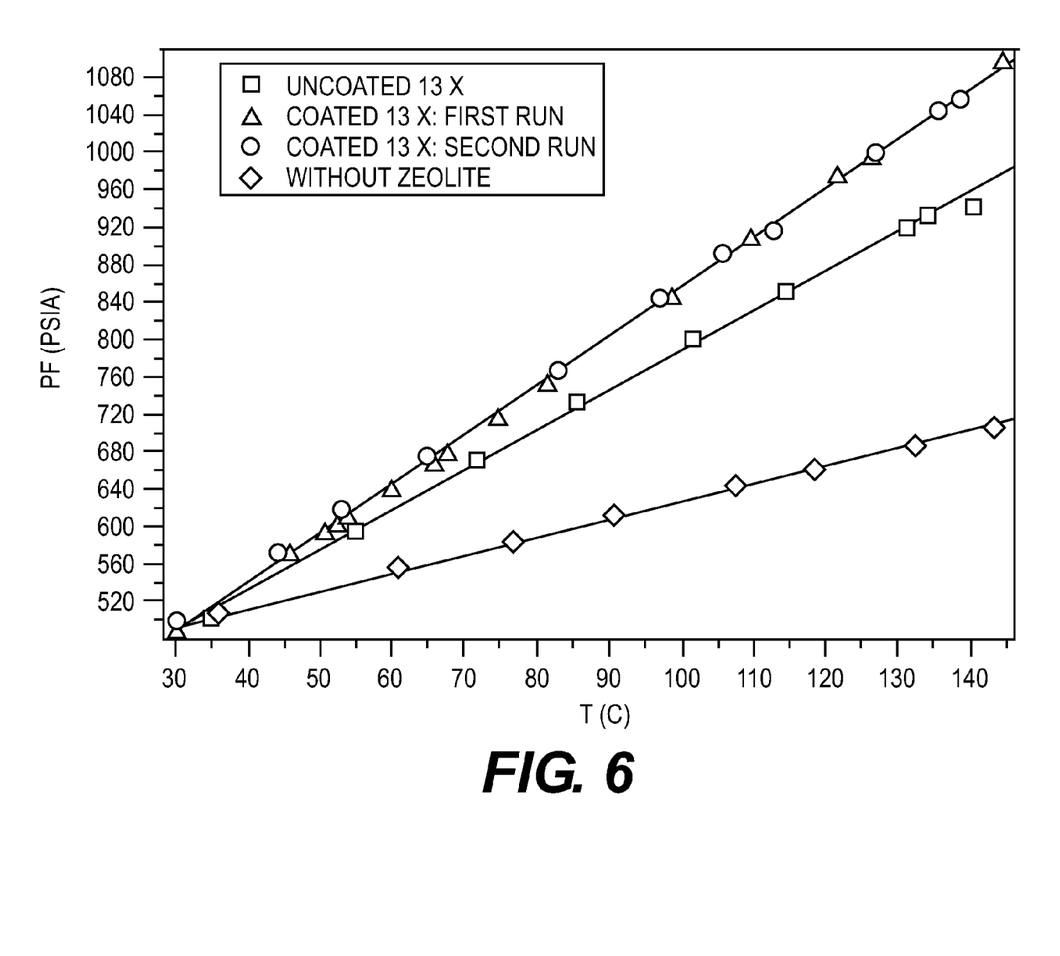
FIG. 6 is a graph illustrating increases in CO2 pressure with temperature in connection with the use of the solid adsorbent in accordance with aspects of the present invention.

The increase in $CO_2$ pressure with temperature of the test vessel is shown in FIG. 6 by the filled diamond symbol. This data represents the amount of pressure increase with temperature when no solid adsorbent is used in the vessel.

EXAMPLE 9

Using the adsorption/desorption apparatus, described in Example 8, the following experiment was carried out: 300 CC (apparent volume) of uncoated 13X zeolite pellets were left in the test vessel. The zeolite pellets filled the entire test vessel. Thermocouple TC1 was located in the middle of the test vessel and as in close contact with the solid adsorbent. With all valves closed except valves V6, V5 and V4, both vessels were brought under vacuum. To activate the uncoated 13X zeolite pellets and remove all atmospheric pre-adsorbed water from the surface of the pellets, valve V4 was closed and the temperature of the test vessel was brought to about 350° C. using an electric heater, shown in FIG. 5, for about 7 hours.

The temperatures of both vessels were then brought to 35° C. With all valves closed except valves V1, V4, and V5, $CO_2$ (the active gas) was sent to both vessels to obtain a steady pressure of 500 psia at 35° C. With all valves closed except valve V5, the pressure of the test vessel as a function of temperature was recorded. The increase in $CO_2$ pressure with temperature of the test vessel is shown in FIG. 6 by the open square symbol, labeled "Uncoated 13X." This data represents the amount of the pressure increase with temperature when solid adsorbent is used in the vessel. The marked increase in pressure, as compared with the empty vessel, demonstrates the advantage of having solid adsorbent in the vessel.

The marked increase in pressure is due to the adsorption of $CO_2$ onto 13X zeolite pellets at lower temperatures and the desorption of $CO_2$ from the 13X zeolite pellets at higher temperatures. Desorption of $CO_2$ increases the number of $CO_2$ molecules in the volume which is responsible for an additional pressure rise in the vessel as compared to an empty vessel described in Example 8.

EXAMPLE 10

Figure 7:
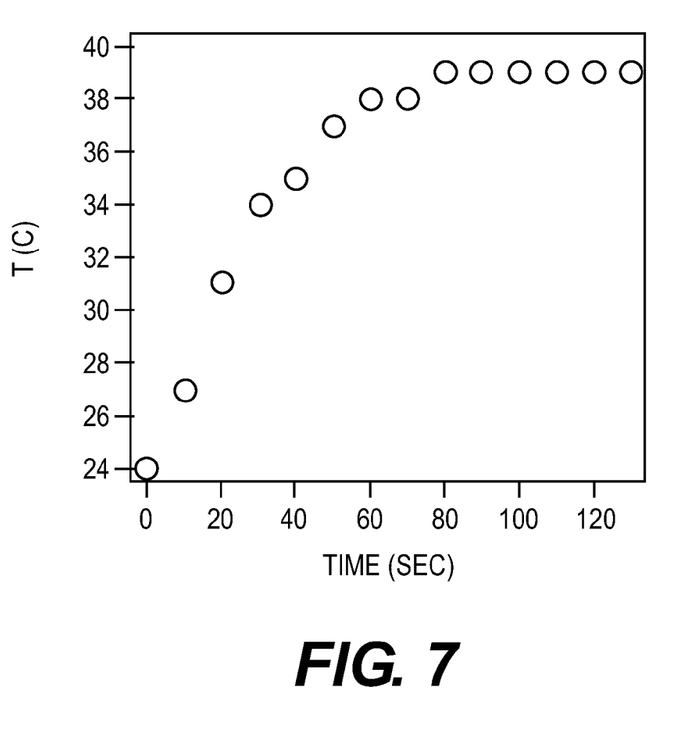
FIG. 7 is a graph illustrating increases in temperature associated with the use of solid adsorbents in accordance with the present invention.

300 CC (apparent volume) of coated 13X zeolite was prepared using the procedure described above. The coated 13X was left in the test vessel. The coated 13X zeolite filled the entire test vessel. Thermocouple TC1 was located in the middle of the test vessel and was in close contact with the solid adsorbent. With valves V1, V2, V3 and V7 closed and valves V4, V5 and V6 open, the vessels were brought under vacuum using a vacuum pump. All valves except valves V1 and V4 were then opened and the dose vessel was filled with $CO_2$ (the active gas) to obtain a steady pressure of 175 psia at 24 C. To introduce $CO_2$ into the coated 13X zeolite, valve V1 was then closed and valve V5 opened and the temperature rise in the test vessel was recorded with thermocouple TC1 as a function of time. The temperature of the test vessel increased from 24 C to 39 C in less than 90 seconds, as shown in FIG. 7. The temperature rise indicates that the active gas, $CO_2$, penetrates through the protective nano layer coating and interacts with the coated 13X zeolite.

EXAMPLE 11

Using the apparatus displayed in FIG. 5, and after the procedure noted in example described in Example 10, CO2 was sent to the vent using valves V2 and V3. The mentioned valves were then closed and using a vacuum pump and all valves in the closed configuration except valves V6, V5, and V4, the vessels were brought under vacuum using a vacuum pump. In contrast to the uncoated zeolite adsorbent where in-situ heating of 350 C is required for activation, no in-situ high temperature heating was applied to the coated zeolite adsorbent. With all valves closed except valves V1, V4 and V5 the pressure was increased to 490 psia at 30 C using CO2. With all valves closed except V5 the pressure of the test vessel was recorded as a function of temperature using a pressure meter and the TC1 thermocouple. The increase in the vessel pressure with temperature is shown in FIG. 6 with the filled square symbols, labeled "Coated 13X: First Run." As shown in FIG. 6, there is a marked increase in pressure, as compared with the empty vessel, which demonstrates the effectiveness of the coated 13X in the adsorption/desorption process. It also demonstrates that the active gas, $CO_2$, is able to penetrate through the coating and adsorb onto the zeolite.

The increase in pressure of the coated zeolite is also greater than that of the uncoated zeoilte as is evident in FIG. 6.

In addition, this example demonstrates that the nano layer coated zeolite 13X performs better than the uncoated one, even without the high temperature activation procedure that is critical for uncoated materials.

EXAMPLE 12

Using the apparatus displayed in FIG. 5, and after concluding the procedures described in Example 11, $CO_2$ was sent to the vent at 140 C using valves V2 and V3. The mentioned valves were then closed and using a vacuum pump and all valves in a closed configuration except valves V6, V5, and V4, the vessels were brought under vacuum at 140 C for about 5 hours. With all valves closed except valves V1, V4 and V5 the pressure was increased to 500 psia at 30 C using $CO_2$. With all valves closed, except valve V5, the pressure of the test vessel was recorded as a function of temperature using a pressure meter and the TC1 thermocouple. The increase in vessel pressure with temperature is shown in FIG. 6 with a filled circle symbol, labeled "Coated 13X: Second Run." As shown in FIG. 6 the repeatability of the pressure vs. temperature data is excellent. This example demonstrates that the coated pellets are stable under the operational conditions.

EXAMPLE 13

After the above procedures, the coated zeolite pellets were taken out of the test vessel. The coating integrity of the pellets was examined by leaving the pellets on the surface of water. The pellets floated, as shown in FIG. 2 indicating that the pellets are still hydrophobic and the coating is intact.

EXAMPLE 14

In a distinguishing example, a portion of the nano layer coated zeolite 13X was placed in an air oven at 300 C for 14 hours, similar to procedure described by Gang Li et. al. The pellets were then cooled down to room temperature. A portion of these materials were then placed on the surface of water in a small beaker. These pellets sank to the bottom of the beaker similar to uncoated pellets (e.g., FIG. 2). This example illustrates that the procedure described by Gang Li et. al cannot produce hydrophobic pellets and destroys the protective coating of the coated pellets.

EXAMPLE 15

In another distinguishing example, a portion of the nano layer coated zeolite 13X was placed in an air oven at 300 C for 14 hours, similar to procedure described by Gang Li et. al. The pellets were then cooled down to room temperature. One (1) gram of these materials was placed in a small beaker in direct contact with a thermocouple. Three (3) grams of water was poured onto the pellets at temperature of 25.7 C. A sudden increase in temperature to maximum value of 64.0 C was observed. The increase of about 38 C indicates a strong interaction between the zeolites and water. This example indicates that the procedure described by Gang Li et. al cannot prevent the adsorption of fluids.

This representative embodiment is provided for exemplary purposes; the application is not limited to the specific embodiments discussed above, or elsewhere in the application. For example, other solid adsorbents can be used in the place of, or in addition to zeolite 13X and other coatings can be used in the place of the one described above.

The present application is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims. It is further to be understood that all values are approximate, and are provided for description. Patents, patent applications, publications, product descriptions, and protocols are cited throughout this application, the disclosures of each of which is incorporated herein by reference in its entirety for all purposes.

The invention claimed is:

1. An adsorption system, comprising:
   (a) a vessel containing a protected solid adsorbent,
   (b) a supply of heating/cooling fluid in fluid communication with the adsorbent in the vessel,
   (c) a supply of working fluid comprising an active agent that can reversibly bind to the solid adsorbent by adsorption, and
   (d) a means for supplying heat to the heating/cooling fluid, the protected solid adsorbent comprising a solid adsorbent substrate and a surface layer which protects the solid adsorbent from interaction with the heating/cooling fluid and is permeable to the active agent to permit the active agent to penetrate the surface layer and adsorb onto the solid adsorbent.

2. The adsorption system of claim 1, wherein the heating/cooling fluid and the working fluid are added together in the vessel.

3. The adsorption system of claim 1, wherein the active agent is $CO_2$.

4. The adsorption system of claim 1, further comprising an expansion valve in fluid communication with the vessel.

5. The adsorption system of claim 1, further comprising a turboexpander in fluid communication with the vessel.

6. The adsorption system of claim 1, wherein the means for supplying heat is a source of waste heat.

7. The adsorption system of claim 1, wherein the surface layer is a nano layer.

8. The adsorption system of claim 1, wherein the surface layer is hydrophobic.

9. The adsorption system of claim 1, wherein the surface layer comprises an organometallic compound.

10. The adsorption system of claim 1, wherein the organometallic compound is octodecyltrichlorosilane.

11. The adsorption system of claim 1, wherein the solid adsorbent substrate is a zeolite.

12. The adsorption system of claim 11, wherein the zeolite is zeolite 13X.

13. The adsorption system of claim 1 in which the solid adsorbent comprises a monolith.

\* \* \* \* \*

UNITED STATES PATENT AND TRADEMARK OFFICE
CERTIFICATE OF CORRECTION

PATENT NO. : 8,500,887 B2  
APPLICATION NO. : 13/035502  
DATED : August 6, 2013  
INVENTOR(S) : Mohsen S. Yeganeh et al.

Page 1 of 1

It is certified that error appears in the above-identified patent and that said Letters Patent is hereby corrected as shown below:

On the title page, under "Related U.S. Application Data," replace "Provisional application No. 61/317,417, filed on March 25, 2010" with "Provisional application No. 61/317,471, filed on March 25, 2010"

Signed and Sealed this  
Twenty-ninth Day of September, 2015

Michelle K. Lee  
*Director of the United States Patent and Trademark Office*